United States Patent
Satoh et al.

(10) Patent No.: US 7,068,289 B2
(45) Date of Patent: Jun. 27, 2006

(54) REARVIEW MONITORING APPARATUS FOR VEHICLE

(75) Inventors: Tatsuya Satoh, Utsunomiya (JP); Noriyuki Hayashi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 361 days.

(21) Appl. No.: 10/242,514

(22) Filed: Sep. 12, 2002

(65) Prior Publication Data

US 2003/0052969 A1    Mar. 20, 2003

(30) Foreign Application Priority Data

Sep. 14, 2001  (JP)  .............................. 2001-280589
Sep. 14, 2001  (JP)  .............................. 2001-280590

(51) Int. Cl.
  *G09G 5/00*    (2006.01)
(52) U.S. Cl. ...................... 345/629; 345/630; 345/634; 345/501
(58) Field of Classification Search ................ 345/629, 345/630, 634, 501; 348/148, 118; 382/284; H04N 7/18
See application file for complete search history.

(56) References Cited

U.S. PATENT DOCUMENTS

| 6,463,363 | B1* | 10/2002 | Okuda ........................... 701/1 |
| 6,476,731 | B1* | 11/2002 | Miki et al. ................... 340/937 |
| 2001/0026317 | A1* | 10/2001 | Kakinami et al. .......... 348/148 |
| 2001/0030688 | A1* | 10/2001 | Asahi et al. ................. 348/118 |
| 2002/0123829 | A1* | 9/2002 | Kuriya et al. ................. 701/1 |
| 2002/0149673 | A1* | 10/2002 | Hirama et al. .............. 348/118 |
| 2003/0021490 | A1* | 1/2003 | Okamoto et al. ........... 382/284 |

FOREIGN PATENT DOCUMENTS

| GB | EP700212 A1 * | 6/1996 |
| JP | 10-151991 | 6/1998 |

* cited by examiner

*Primary Examiner*—Matthew C. Bella
*Assistant Examiner*—Mike Rahmjoo
(74) *Attorney, Agent, or Firm*—Lahive & Cockfield, LLP; Anthony A. Laurentano, Esq.

(57) ABSTRACT

A CCD camera takes rearview images of a vehicle so as to input them into a superposing image displaying device, and a vehicle index database stores a vehicle index indicating a vehicles's protruding region such as a spare tire for displaying the protruding region over a rear end of a rear reference position such as a bumper of the vehicle in the rearview image. A superposed image displaying device superposes the vehicle index stored in the vehicle index database and the rearview image taken by the CCD camera so as to provide a monitoring device. Thus, a rearview monitoring apparatus for a vehicle for displaying the rearview image of the vehicle and information of the protruding region for occupants in the vehicle can be provided.

4 Claims, 20 Drawing Sheets

REARVIEW MONITORING APPARATUS FOR VEHICLE

BACKGROUND OF THE INVENTION

1. Field of the Invention

The present invention relates to a rearview monitoring apparatus for a vehicle which is carried on the vehicle and displays rearview images taken by a camera device to occupants in the vehicle.

2. Description of Related Art

Conventionally, a rearview monitoring apparatus for a vehicle for taking rearview images of the vehicle by a camera and displaying the rearview images as supplementary information for a driver by a monitoring device which is located near a driver's seat is known.

As such an apparatus, for example, an apparatus which comprises a camera for taking a rearview image of the vehicle and a superposing device which displays a vehicle width line indicating the width of the vehicle and a distance line indicating the distance of an obstacle from the vehicle in an image taken by the camera is disclosed in Japanese Unexamined Patent Application, First Publication No. Hei 10-151991.

This apparatus changes the line width and the line color of the distance line in the rearview image of the vehicle which is displayed by the superposing device according to the distance of the obstacle from the vehicle and provides accurate information such as distance to the obstacle and the vehicle width line to a occupant in the vehicle by adjusting the display position of the distance line and the vehicle width line according to inclination of the vehicle and the change in the vehicle height. Also, in this apparatus, the occupants in the vehicle acknowledge a positioning relationship of the vehicle to the obstacle around the vehicle by displaying a rear end part of the vehicle in the superposed image.

FIG. 14 is an example of a image view which is displayed by such a conventional rearview monitoring apparatus for a vehicle as explained above. In such a conventional apparatus, a rear end 51 of a bumper which is taken in a viewing angle of the camera for acknowledging the position of the vehicle, a tire width line 55 indicating a track of tire passage, and a distance index such as 1 m line 52, 2 m line 53, and 3 m line 54 indicating a distance to the obstacle from the rear end 51 of the bumper are displayed in the rearview image.

However, it was not possible to acknowledge sufficiently the positioning relationship between the vehicle and the obstacle around the vehicle when a protruding object such as a spare tire is attached on the rear end of the vehicle, even though it was possible to acknowledge the positioning relationship between the vehicle and the obstacle around the vehicle by displaying the rear end part of the vehicle in the rearview image of the conventional apparatus.

That is, when a spare tire 23 is attached on the rear end of the vehicle as shown in FIG. 15 which shows a conventional example of a positioning relationship of the vehicle 21 and a charge coupled device (hereinafter called a CCD) camera 2, the situation around the vehicle cannot be displayed because a region in a dead angle increases when the spare tire 23 is in the rearview image. Therefore, the attaching position and the angle of view of the CCD camera 2 are often adjusted so that the spare tire 23 is not displayed in the rearview image as shown in FIGS. 16 and 17 (modified example in the conventional example). In such a case, the spare tire 23 is not displayed in the rearview image. For example, as shown in FIG. 18, the positioning relationship of the obstacle 24 around the vehicle and the spare tire 23 could not be understood according to a limit line (rear end 51 of the bumper) displayed in the rearview image.

Also, even if a portion of the spare tire 23 could be displayed in the rearview image, the region in the dead angle increased and the CCD camera could not take an image of a rear end portion of the spare tire directly as explained above. Thus, there was a problem in that it was impossible to understand the positioning relationship of the obstacles around the vehicle and the spare tire 23 according to the rearview image sufficiently.

Also, when displaying the positioning relationship of the distance line and the actual vehicle, a space for opening a tailgate (a back door of the vehicle which opens over the rear end of the vehicle) was not taken into account. Therefore, there was sometimes a problem in that the tailgate of the vehicle could not be opened after the vehicle was parked.

Also, on the other hand, there were problems as follows. It was possible to park the vehicle 21 extremely near an obstacle 24 by using a conventional rearview monitoring apparatus for a vehicle as long as the tailgate 123 which was provided to the vehicle 21 was not supposed to be opened similarly to the positioning relationship of the vehicle 21, a rear end portion of the bumper 22 (rear end 51 of the bumper in FIG. 8) taken by a CCD camera 2, and the obstacles 24 around the vehicle 21 as shown in FIG. 19. However, when the vehicle 21 was parked while the tailgate 123 provided to the vehicle 21 was supposed to be opened, it was not possible to understand the positioning relationship of the obstacles 24 around the vehicle 21 and the opened tailgate 123 according to the limit line (rear end 51 of the bumper) displayed in the rearview image as shown in FIG. 20. Therefore, the occupants in the vehicle 21 could not park the vehicle 21 near the obstacles 24 while having a space for the tailgate 123 to open.

SUMMARY OF THE INVENTION

The present invention was made in consideration of the above-mentioned problems. An object of the present invention is to provide a rearview monitoring apparatus for a vehicle for displaying a rearview image of the vehicle taken by a camera device, information regarding a protruding portion of the vehicle and a movable range of the tailgate of the vehicle for the occupants in the vehicle.

In order to solve the above-mentioned problems, a first aspect of the present invention is characterized in that, a rearview monitoring apparatus for a vehicle for displaying a rearview image which is taken by a camera for covering a rearview of the vehicle to occupants in the vehicle comprises a vehicle index storing device (for example, a vehicle index database 6 in embodiments) for storing a vehicle index representing a vehicle's protruding region which protrudes over a rear reference position of the vehicle in advance, and a superposed image displaying device (for example, a superposed image displaying device 7 in embodiments) for superposing the vehicle index onto the vehicle's protruding region in the rearview image according to the position of the vehicle's protruding region.

By doing this, it is possible to display a superposed image of the vehicle's rear reference position and the vehicle's protruding region which cannot be acknowledged in the rearview image of the vehicle in a form of an index such as lines and pictures which are stored in the vehicle index storing device in advance by using the superposed image displaying device. Also, it is possible to notify the occupants in the vehicle of the distance information which is necessary in order that the vehicle's protruding region not collide with obstacles around the vehicle.

According to a first aspect of the present invention, a superposed image of the vehicle's rear reference position and the vehicle's protruding region which cannot be acknowledged in the rearview image of the vehicle can be displayed by using the superposed image displaying device in a form of an index such as lines and pictures which are stored in the vehicle index storing device in advance. Also, the occupants in the vehicle can be notified of the distance information which is necessary in order that the vehicle's protruding region not collide obstacles around the vehicle.

Therefore, the effect is obtained that the occupants in the vehicle can park the vehicle very close to obstacles around the vehicle having a necessary clearance for avoiding collision between the vehicle's protruding region and the obstacles around the vehicle.

A second aspect of the present invention is characterized in that, in a rearview monitoring apparatus for a vehicle, the rear reference position of the vehicle is a rear end surface of a bumper (for example, a rear end of a bumper 22 and a rear end of a bumper 51 in embodiments) which is attached in the back of the vehicle, and the vehicle's protruding region is a spare tire (for example, a spare tire 23 in embodiments) which is attached in the back of the vehicle.

By doing this, it is possible to display a superposed image of the rear end face of a bumper and a spare tire which cannot be acknowledged in the rearview image of the vehicle in a form of an index such as lines and pictures which are stored in the vehicle index storing device in advance by using the superposed image displaying device. Also, it is possible to notify the occupants in the vehicle of the distance information which is necessary in order that the vehicle's protruding region not collide with obstacles around the vehicle.

According to the second aspect of the present invention, a superposed image of the rear end face of the bumper and the spare tire which cannot be acknowledged in the rearview image of the vehicle can be displayed by using the superposed image displaying device in a form of an index such as lines and pictures which are stored in the vehicle index storing device in advance. Also, the occupants in the vehicle can be notified of the distance information which is necessary in order not that the vehicle's protruding region collide obstacles around the vehicle.

Therefore, the effect is obtained that the occupants in the vehicle can park the vehicle very close to obstacles around the vehicle having a necessary clearance for avoiding collision between the vehicle's protruding region and the obstacles around the vehicle.

A third aspect of the present invention is characterized in that, in a rearview monitoring apparatus for a vehicle, the vehicle index is a projected image of the vehicle's protruding region on a road surface.

By doing this, it is possible to notify the occupants in the vehicle of more detail information such as space which is actually occupied by the vehicle's protruding region.

According to the third aspect of the present invention, more detailed information such as space which is actually occupied by the vehicle's protruding region can be notified to the occupants in the vehicle.

Accordingly, the effect is obtained that the occupants in the vehicle can park the vehicle having a space which is supposed to be occupied by the vehicle's protruding region in accordance with the actual situation around the vehicle.

A fourth aspect of rearview monitoring apparatus for vehicle according to the present invention is characterized in that, a rearview monitoring apparatus for a vehicle for displaying a rearview image which is taken by a camera device (for example, a CCD camera 2 in the embodiments) for covering the rear view of the vehicle (for example, a vehicle 21 in embodiments) to occupants in the vehicle comprises a vehicle index storing device (for example, a vehicle index data base 6 in embodiments) for storing a vehicle index representing a vehicle's back door (for example, a tailgate 123 in embodiments) which is open beyond a rear reference position (for example, a rear end of a bumper 22 and a bumper rear end 51 in embodiments) of the vehicle in advance, and a superposed image displaying device (for example, a superposed image display section 7 in the embodiments) for superposing the vehicle index onto the vehicle's back door in the rearview image according to the position of the vehicle's back door.

By doing this, it is possible to display a superposed image of the vehicle rear reference position and an open rear door of the vehicle which cannot be acknowledged in the rearview image of the vehicle during parking the vehicle in a form of an index such as lines and pictures which are stored in the vehicle index storing device in advance by using the superposed image displaying device. Also, it is possible to notify the occupants in the vehicle of the distance information which is necessary in order that the rear door not collide with obstacles around the vehicle while actually opening and closing the rear door of the vehicle after parking the vehicle.

According to the fourth aspect of the present invention, a superposed image of the vehicle rear reference position and an open rear door of the vehicle which cannot be acknowledged in the rearview image of the vehicle during parking the vehicle can be displayed in a form of an index such as lines and pictures which are stored in the vehicle index storing device in advance by using the superposed image displaying device. Also, the occupants in the vehicle can be notified of the distance information which is necessary in order not that the rear door collide obstacles around the vehicle while actually opening and closing the rear door of the vehicle after parking the vehicle.

Therefore, the effect is obtained that the occupants in the vehicle can park the vehicle very close to obstacles around the vehicle while having necessary clearance for opening and closing the rear door of the vehicle after parking the vehicle.

A fifth aspect of the present invention is characterized in that in a rearview monitoring apparatus for a vehicle, a vehicle index is a projected image of the track of the door movement on a road surface.

By doing this, it is possible to notify the occupants in the vehicle of further necessary information such as the space necessary for avoiding the rear door from colliding with the obstacles around the vehicle when the rear door is opened and closed after the vehicle is parked.

According to the fifth aspect of the present invention, the occupants in the vehicle can be notified of further necessary information such as the space necessary for avoiding the rear door from colliding with the obstacles around the vehicle when the rear door is opened and closed after the vehicle is parked.

Therefore, an effect is obtained in that the occupants in the vehicle can park the vehicle avoiding the obstacles around the vehicle so as to have the space necessary for opening and closing the rear door of the vehicle in actuality after the vehicle is parked.

A sixth aspect of the present invention is characterized in that, in a rearview monitoring apparatus for a vehicle, the vehicle index storing device stores a plurality of the vehicle indexes according to the opening extent of the back door which can be opened incrementally, and the superposed image displaying device superposes a plurality of the vehicle indexes in the rearview image.

By doing this, it is possible to notify the occupants in the vehicle of more detailed information such as the distance, or a space for avoiding the rear door from colliding with the obstacles around the vehicle when the rear door is opened and closed after the vehicle is parked.

According to the sixth aspect of the present invention, the occupants in the vehicle can be notified of more detailed information such as the distance, or a space for avoiding the rear door from colliding with the obstacles around the vehicle when the rear door is opened and closed after the vehicle is parked.

Therefore, the effect is obtained that the occupants in the vehicle can park the vehicle while avoiding the obstacles around the vehicle so as to have the space necessary for opening and closing the rear door of the vehicle in actuality after the vehicle is parked.

Therefore, the occupants in the vehicle can park the vehicle in the position desirably corresponding to the opening amount of the rear door of the vehicle.

DETAILED DESCRIPTION OF THE INVENTION

A rearview monitoring apparatus according to an example of the present invention is explained with reference to the drawings as follows. Here, a vehicle's protruding region is explained referring to a spare tire which is attached to a rear end of a vehicle to simplify the explanation.

Figure 1:
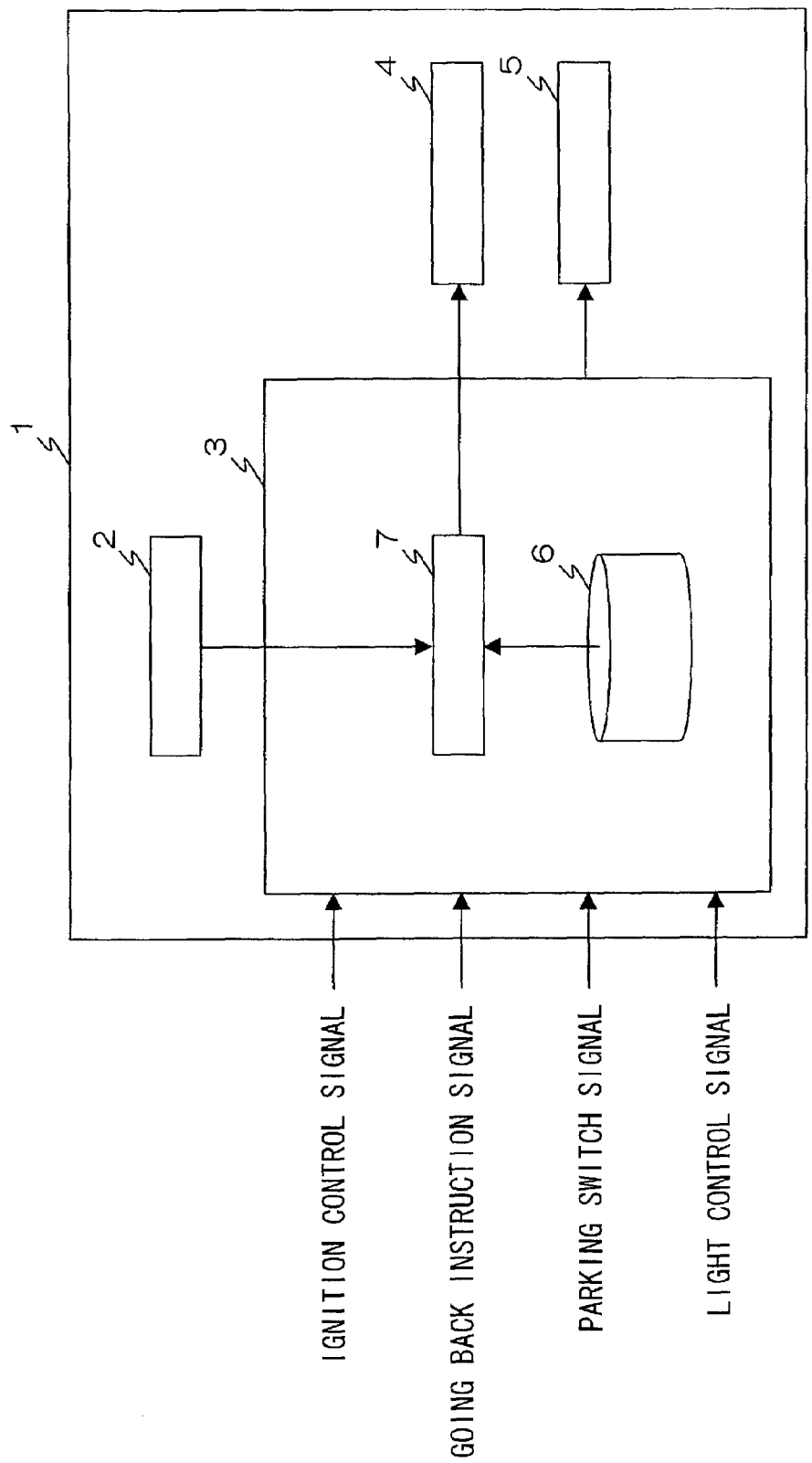
FIG. 1 is a block diagram showing a first embodiment of a rearview monitoring apparatus for a vehicle according to an embodiment of the present invention.
Figure 15:
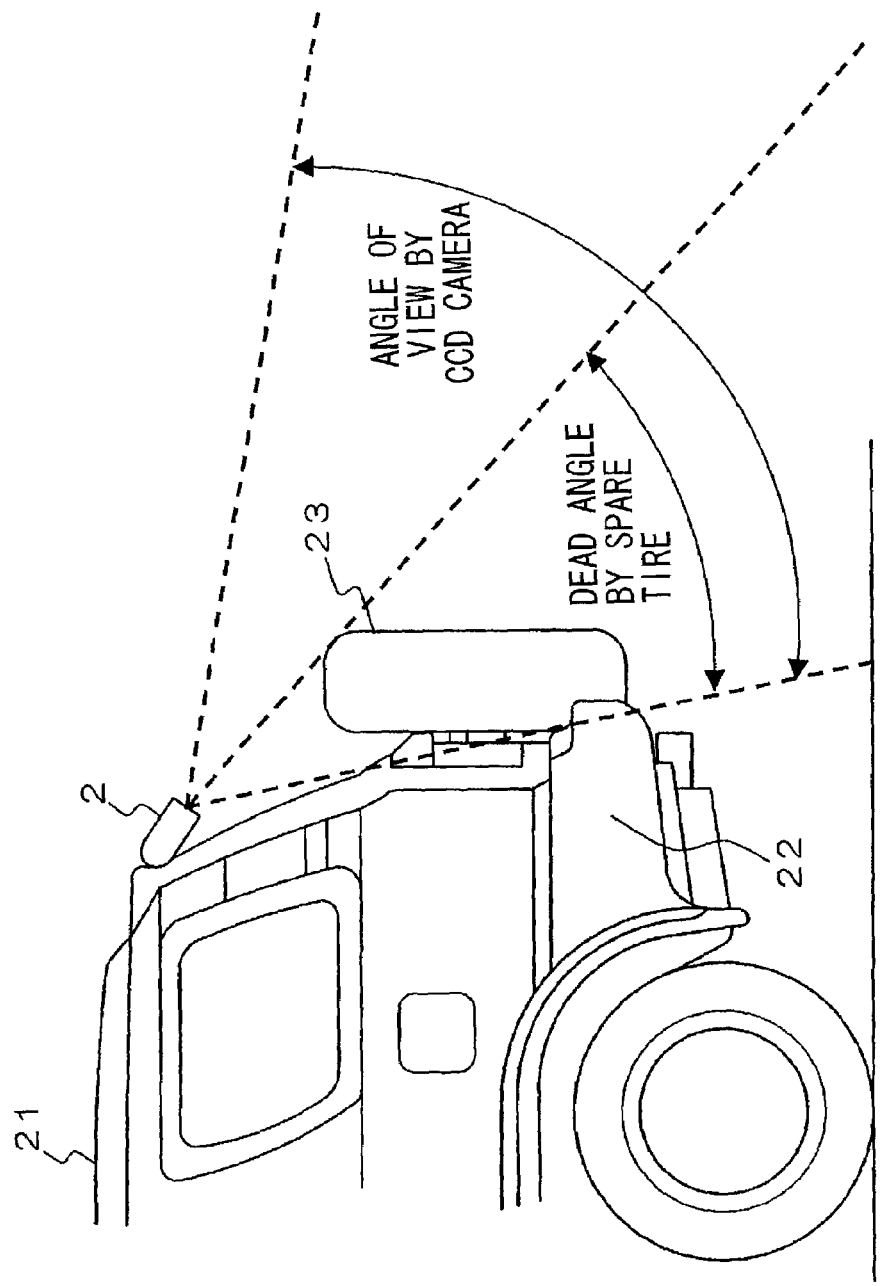
FIG. 15 is a view for showing a positioning relationship of a vehicle and a camera.
Figure 16:
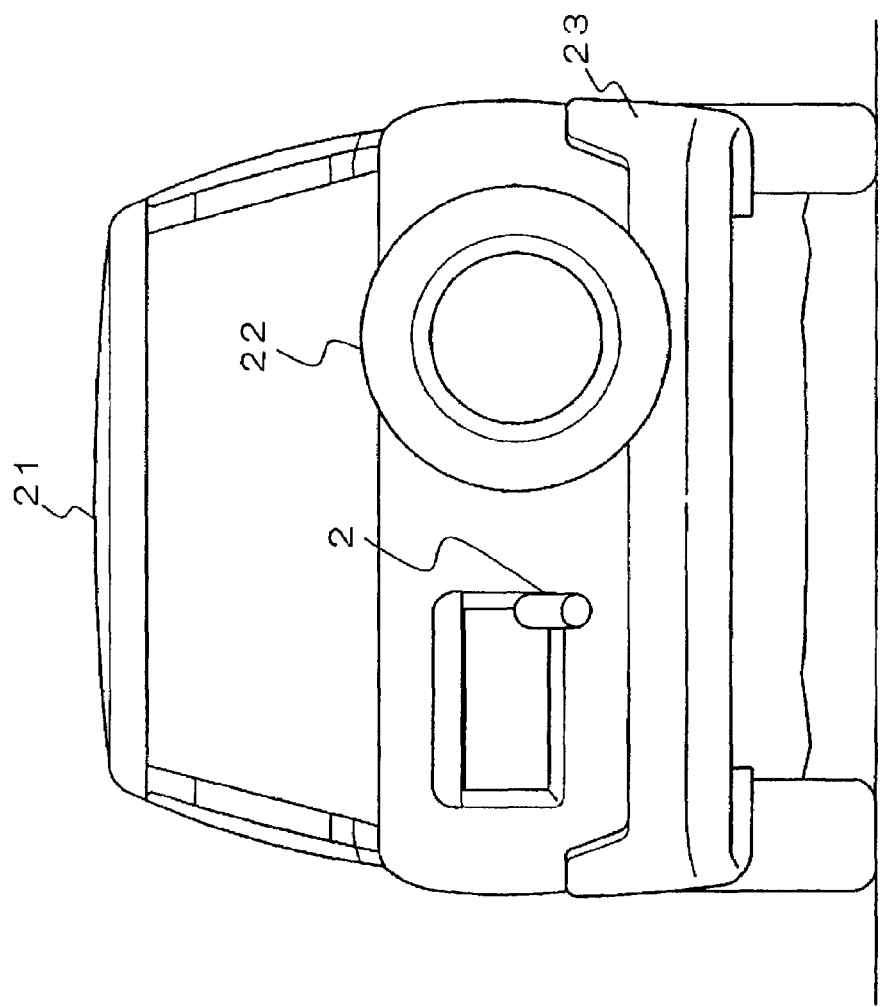
FIG. 16 is a view for showing a modified positioning relationship of a vehicle and a camera.
Figure 17:
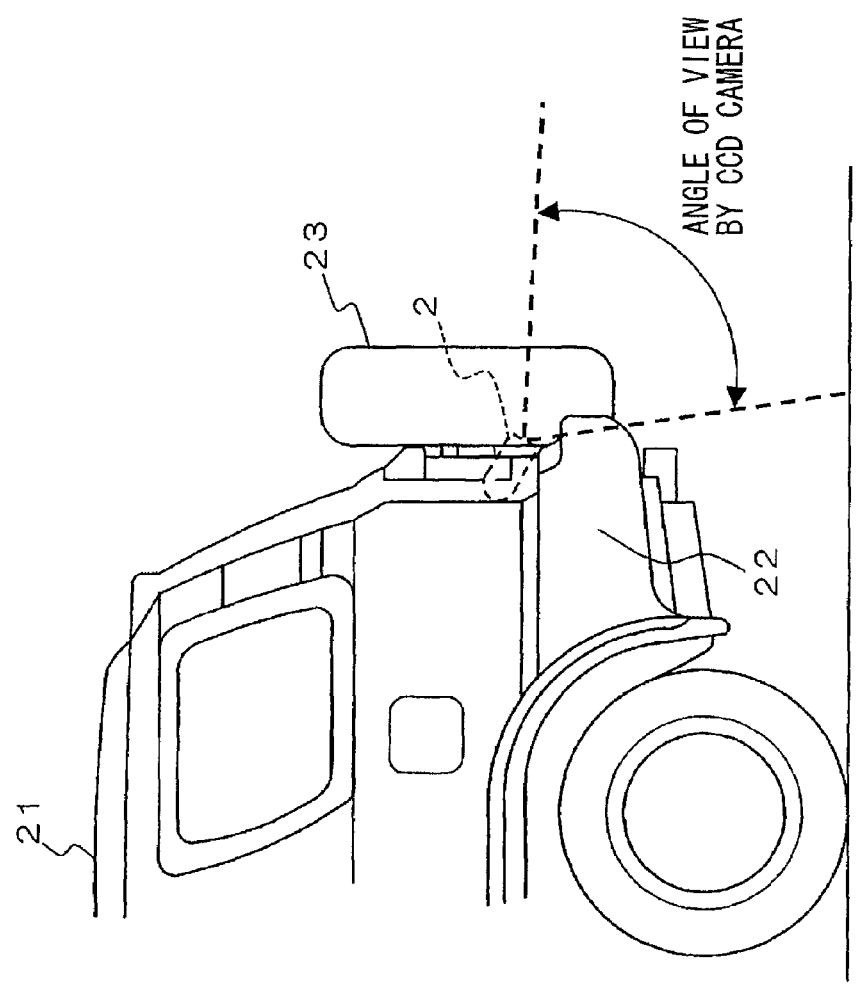
FIG. 17 is a view for showing a modified positioning relationship of a vehicle and a camera.
Figure 18:
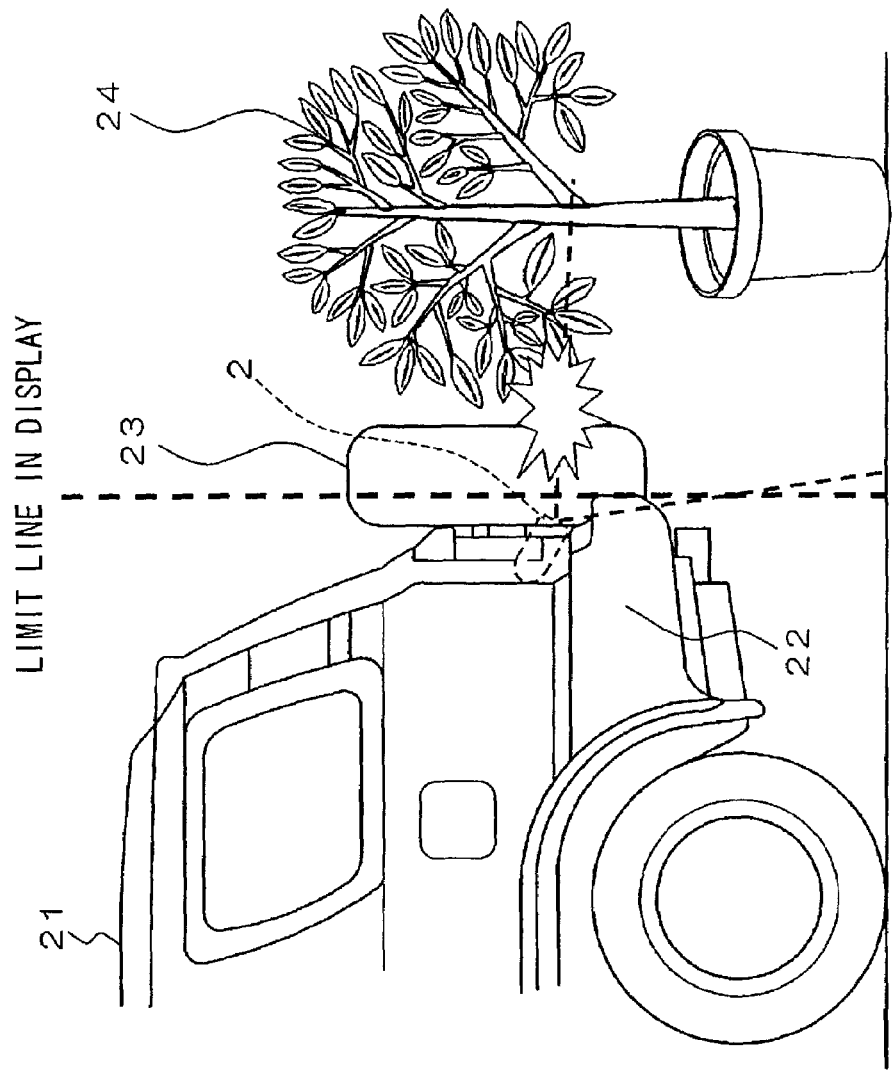
FIG. 18 is a view for showing a relative position of a vehicle and obstacles when a vehicle is parked using a modified conventional apparatus.

In FIG. 1, a rearview monitoring apparatus 1 for a vehicle according to the present invention comprises a CCD camera 2 which is provided to a rear section of a vehicle 21 for taking a rearview image of the vehicle 21 as shown in FIGS. 15 and 16, a controlling unit 3 including CPU (central processing unit) for controlling movement of each unit in the rearview monitoring apparatus by executing application programs for controlling displayed image, a monitoring device 4 for displaying the rearview image which is output from the controlling unit 3 for occupants in the vehicle 21, and a speaker 5 for notifying the occupants in the vehicle 21 of approach to obstacles.

Also, the controlling unit 3 includes a vehicle index database 6 for storing a vehicle index which indicates a spare tire 23 in advance for displaying the spare tire 23 (vehicle's protruding region) protruding in a rear direction over a rear reference position of the vehicle 21 as shown in FIGS. 15 and 16 on the rearview image and a superposed image displaying device 7 for displaying the rearview image which is taken by the CCD camera 2 and the vehicle index which is stored in the vehicle index database 6 on the monitoring device 4.

Furthermore, for controlling signals used for displaying a superposed image, an ignition control signal which indicates whether or not an engine has started, a reversing instruction signal which indicates whether or not a shift position of a transmission is in a reversing position, a parking switch signal which indicates whether of not a parking brake is working, and a light controlling signal which indicates whether or not a light is turned on, are input from an ignition circuit, a shift positioning censor, a parking brake switch, and a light turning circuit (none are shown in the drawings).

Next, movement of the rearview monitoring apparatus according to the present invention is explained with reference to the drawings as follows.

FIRST EXAMPLE

First, a case is explained in which the rearview monitoring apparatus for a vehicle displays a superposed image of a vehicle's protruding region which protrudes in a rear direction over a rear reference position of the vehicle in a corresponding position of the vehicle's protruding region in the rearview image as a vehicle index which is indicated by lines according to a first example of the present invention.

Figure 2:
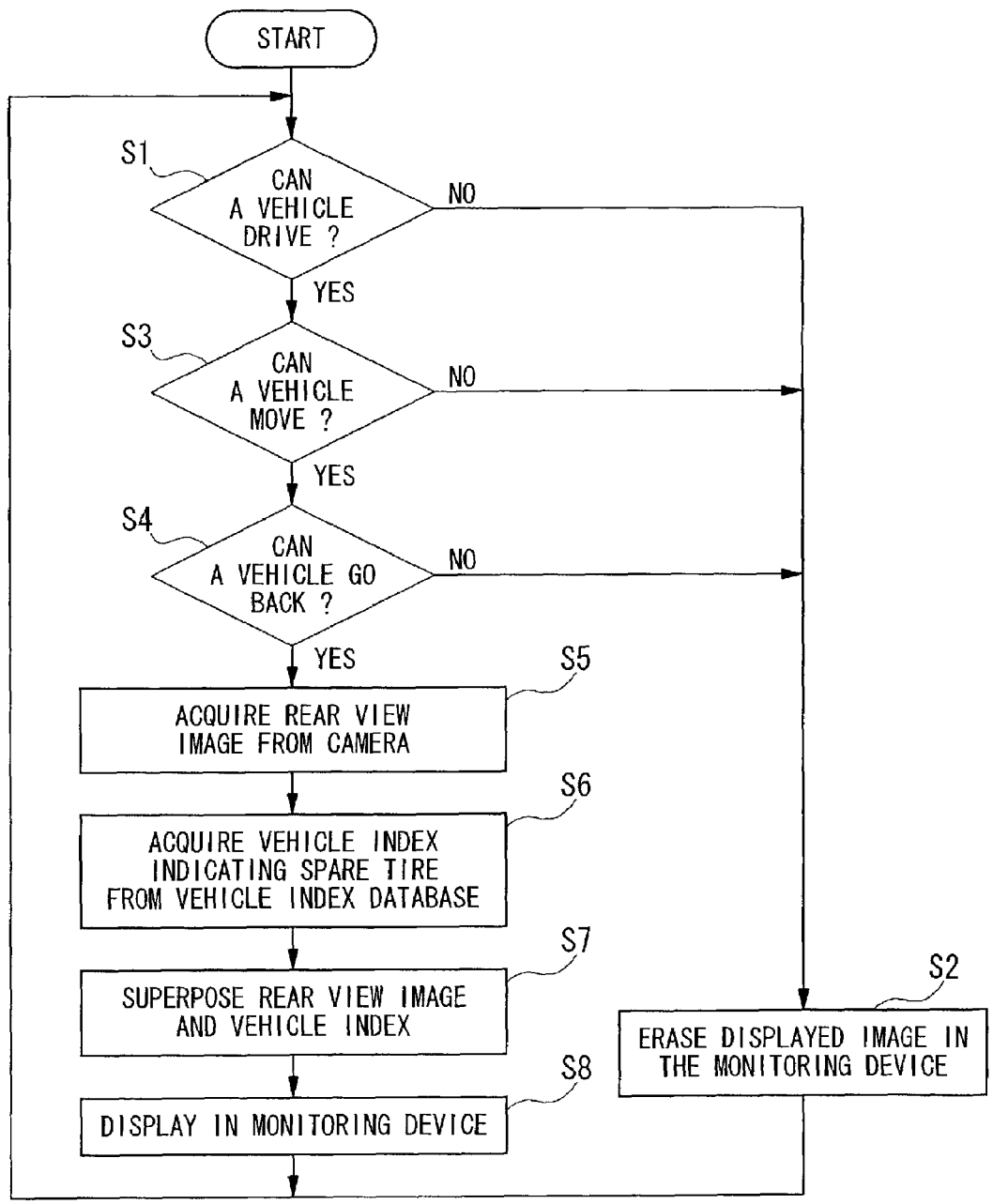
FIG. 2 is a flow chart showing a movement of the rearview monitoring apparatus for a vehicle according to an embodiment of the present invention.

FIG. 2 is a flow chart for showing a movement of the rearview monitoring apparatus 1 for a vehicle for displaying a rearview image in a monitoring device 4. First, a controlling unit 3 in the rearview monitoring apparatus 1 for vehicle determines whether or not the engine has started by the ignition signal and the vehicle 21 can be driven (Step S1).

In Step S1, when an engine has not started and a vehicle is not ready to be driven (NO in Step 1), a superposed image displaying device 7 in a control section 3 erases an image which is displayed on a monitoring device 4 (Step S2); thus, the superposed image displaying device waits for the engine to be started so that the vehicle 21 can be driven.

On the other hand, in the Step S1, when the engine has started and the vehicle can be driven (YES in Step S1), the control section 3 consequently determines whether or not a parking brake is released by a parking switch signal so as to drive the vehicle (Step S3).

In Step S3, when the vehicle is not ready to be driven (NO in Step S3), the superposed image displaying device 7 in the control section 3 erases the image which is displayed on the monitoring device 4 (Step S2), goes back to Step S1, repeats the above-mentioned processes, and waits for a parking brake to be released so that the vehicle 21 can be driven.

Also, in Step S3, when the vehicle can be driven (YES in Step S2), the control section 3 determines whether or not the vehicle 21 is supposed to reverse by the reverse instruction signal (Step S4).

In Step S4, when the vehicle 21 is not supposed to reverse (NO in Step S4), the superposed image displaying device 7 in the control section 7 erases an image which is displayed on the monitoring device 4 (Step S2), reverse to Step S1, repeats the above-mentioned processes, and waits for the vehicle to reverse.

Also, in Step 4, when the vehicle 21 is supposed to reverse (YES in Step S4), the superposed image displaying device 7 in the control section 3 acquires a rearview image of the vehicle 21 from a CCD camera 2 (Step S5).

Next, the superposed image displaying device 7 acquires a vehicle index which indicates a spare tire 23 from a vehicle index database 6 (Step S6).

Consequently, the superposed image displaying device 7 superposes the vehicle index which indicates the spare tire 23 on the rearview image (Step S7) and displays the superposed image on the monitoring device 4 (Step S8).

When the superposed image of the rearview image and the vehicle index is displayed on the monitoring device 4, the superposed image displaying device 7 in the control section 3 goes back to Step S1 and repeats the above-mentioned processes.

In addition, when the monitoring device 4 displays the superposed image, it is acceptable that the control section 3 determine whether or not a light which is attached on the vehicle 21 is turned on by the light control signal (whether or not it is dark around the vehicle 21) and brightness and contrast of the rearview image which is displayed on the monitoring device 4 are automatically adjusted.

Figure 3:
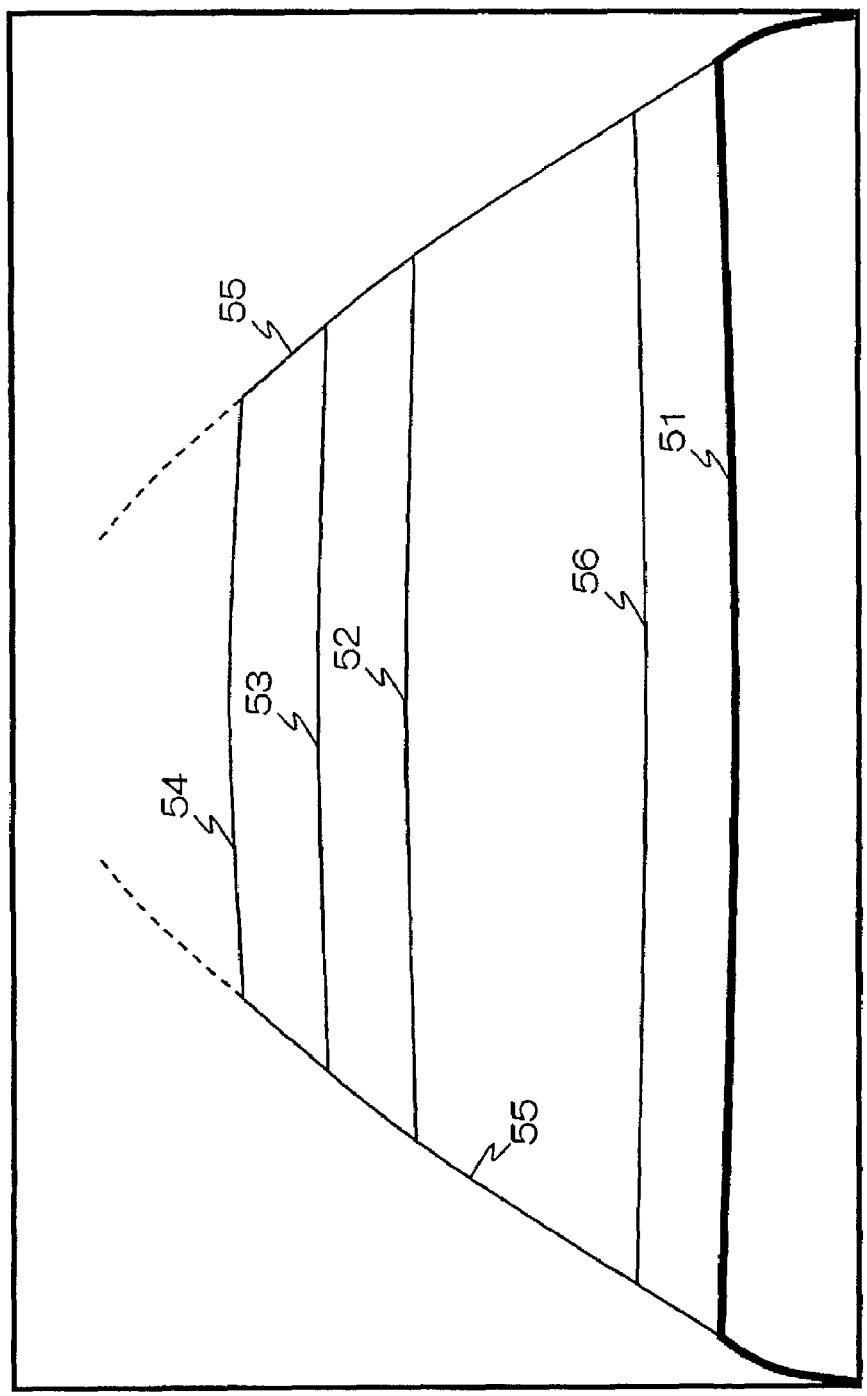
FIG. 3 is a view for showing an example of displayed rearview image in the first example of embodiments.

FIG. 3 is a view for showing an example of a displayed rearview image according to the first example of the present invention. In FIG. 3, a distance index 52 which indicates 1 m of distance from a rear end of a conventional bumper, a distance index 53 which indicates 2 m of distance from a rear end of a conventional bumper, and a distance index 54 which indicates 3 m of distance from a rear end of a conventional bumper are displayed. In addition, a spare tire width line 56 as a vehicle index which indicates a position of a rear end of the spare tire 23 which is not displayed in the rearview image as a real image is displayed in the FIG. 3.

Figure 4:
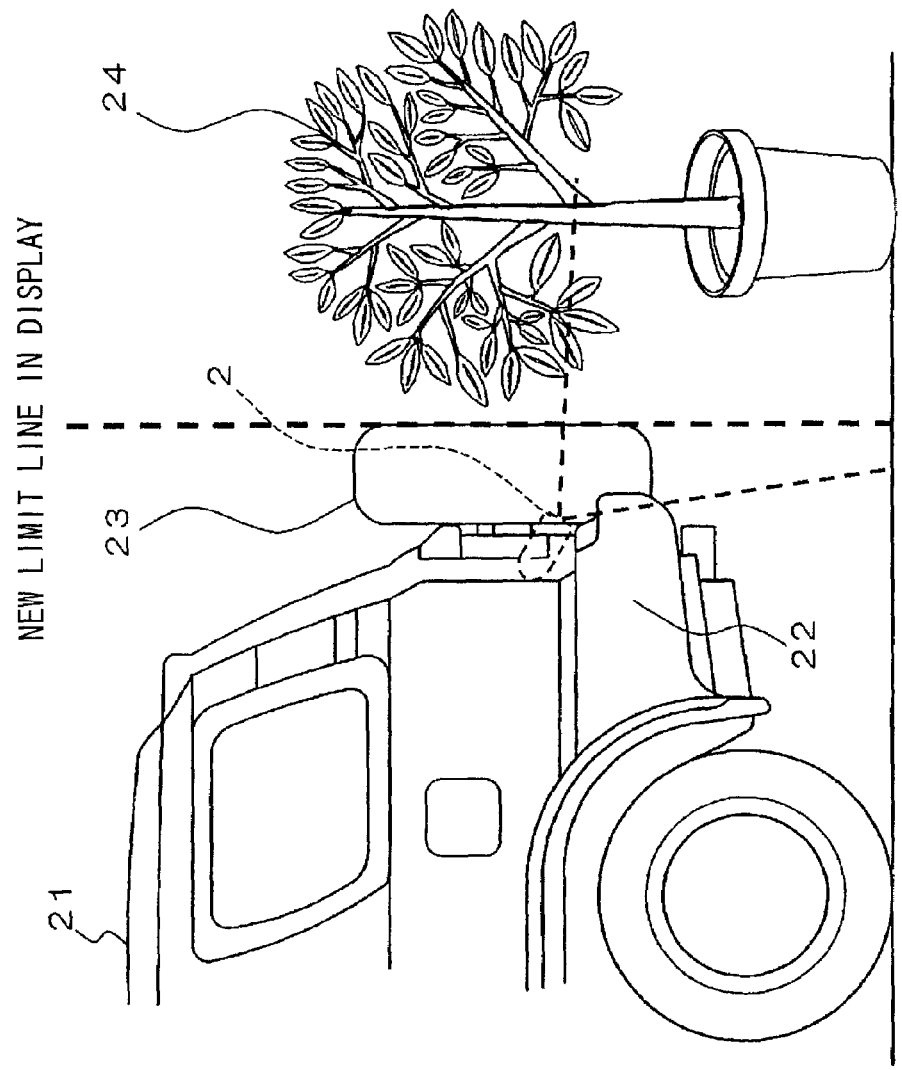
FIG. 4 is a view for showing a relative position of a vehicle and obstacles when a vehicle is parked using a rearview monitoring apparatus for a vehicle according to the first example of the embodiments.

Therefore, as shown in FIG. 4, the occupants in the vehicle 21 can park a vehicle 21 very close to as obstacle 24 so that the spare tire 23 does not contact the obstacle 24.

SECOND EXAMPLE

Next, as a second example, a case in which the rearview monitoring apparatus for a vehicle displays a superposed image of the vehicle's protruding region which protrudes in a rear direction over the rear reference position of the vehicle as a vehicle index which is indicated by a picture such as a projected shadow on the road surface in a position corresponding to the vehicle's protruding region in the rearview image is explained.

Here, in this example, an operation of the rearview monitoring apparatus 1 for a vehicle for displaying the rearview image in the monitoring device 4 is the same as the case of the first example of the present invention. Also, the vehicle's protruding region is explained with reference to a spare tire 23 which is attached to the rear end of the vehicle 21.

Figure 5:
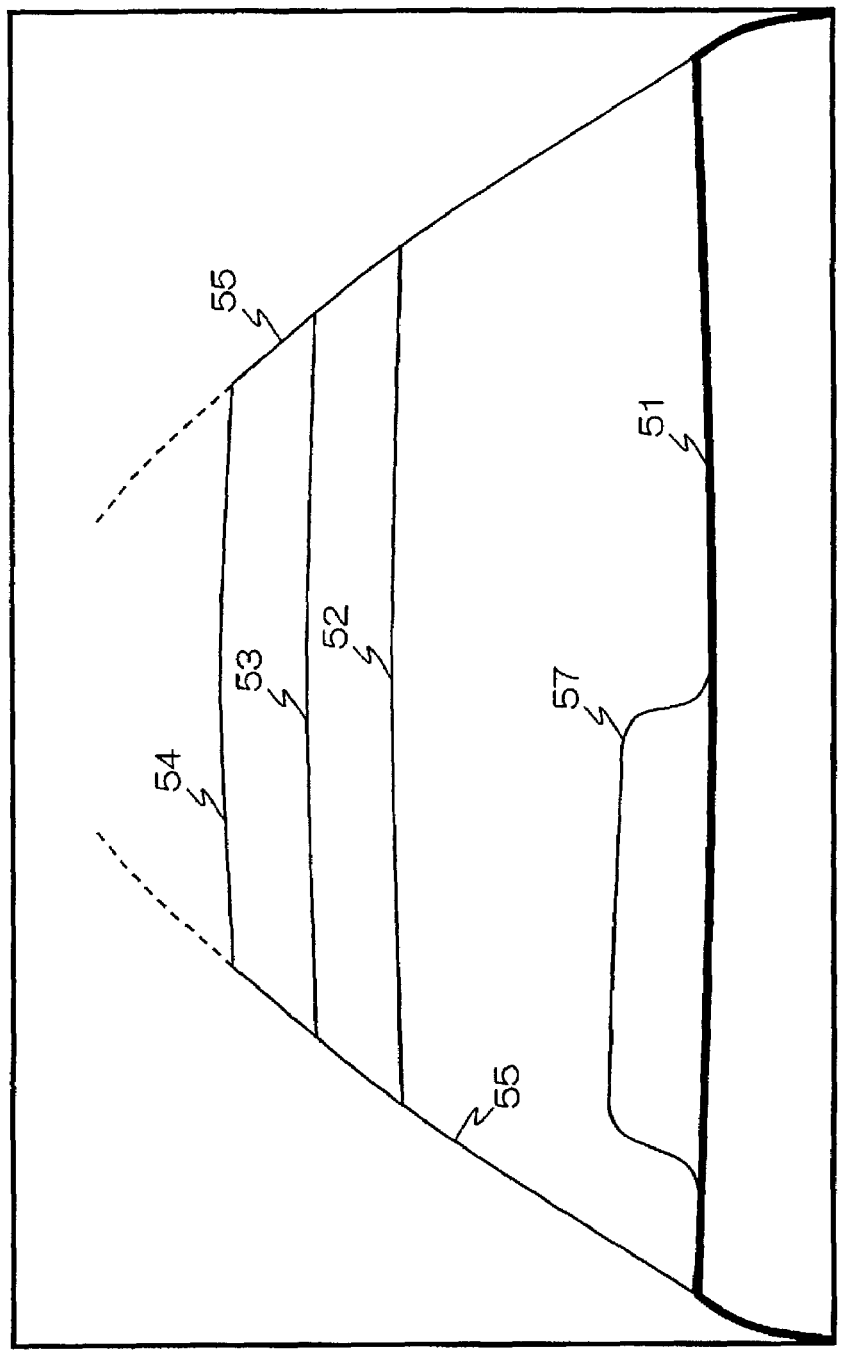
FIG. 5 is a view for showing an example of displayed rearview image according to a second example of the embodiments.

FIG. 5 is a view for showing an example of displayed rearview image according to the second example of the present invention. In FIG. 5, a distance index 52 which indicates 1 m of distance from a rear end of a conventional bumper, a distance index 53 which indicates 2 m of distance from a rear end of a conventional bumper, and a distance index 54 which indicates 3 m of distance from a rear end of a conventional bumper are displayed. In addition, a spare tire end line 57 as a vehicle index which is indicated by a shadow line of the spare tire such as a projected shadow on the road surface is displayed in the rearview image so as to show the position of the rear end of the spare tire 23 of which the real image is not displayed therein.

Figure 6:
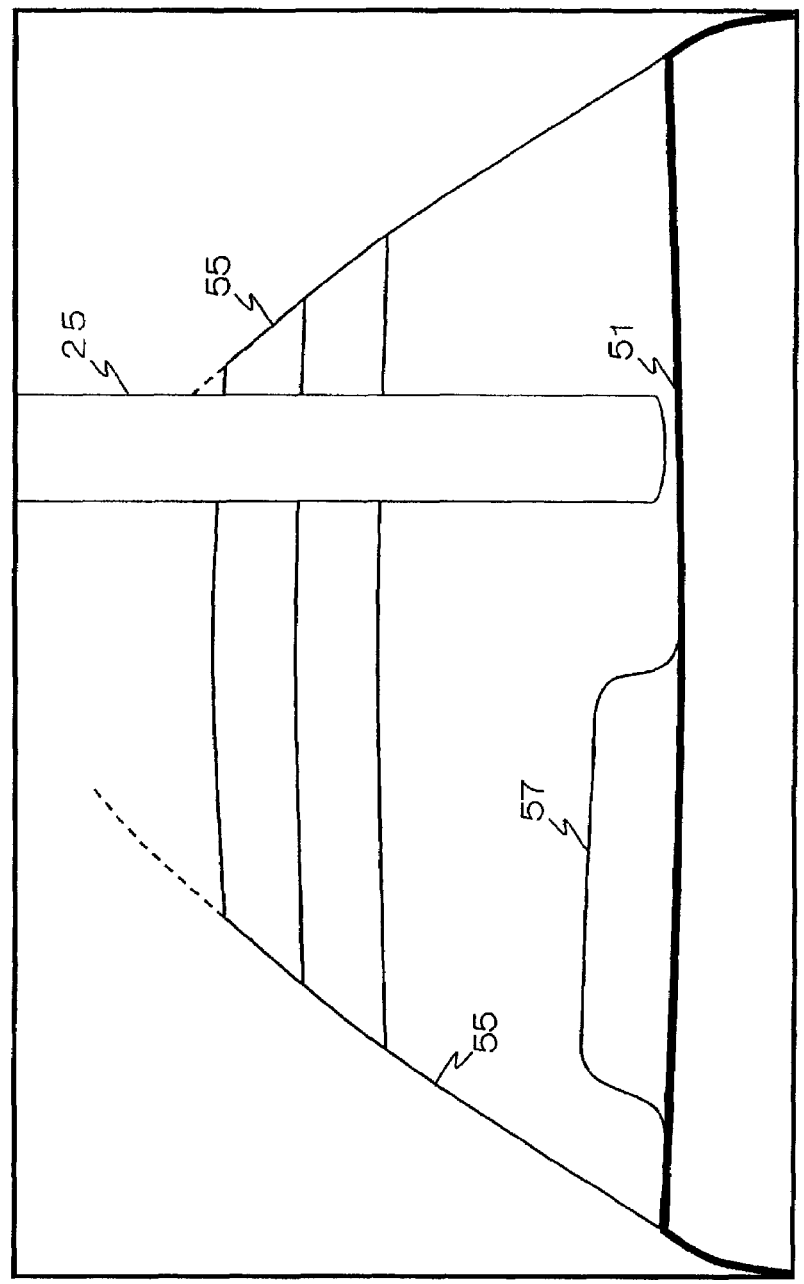
FIG. 6 is a view for showing an example of displayed obstacle in the rearview image according to the example.
Figure 7:
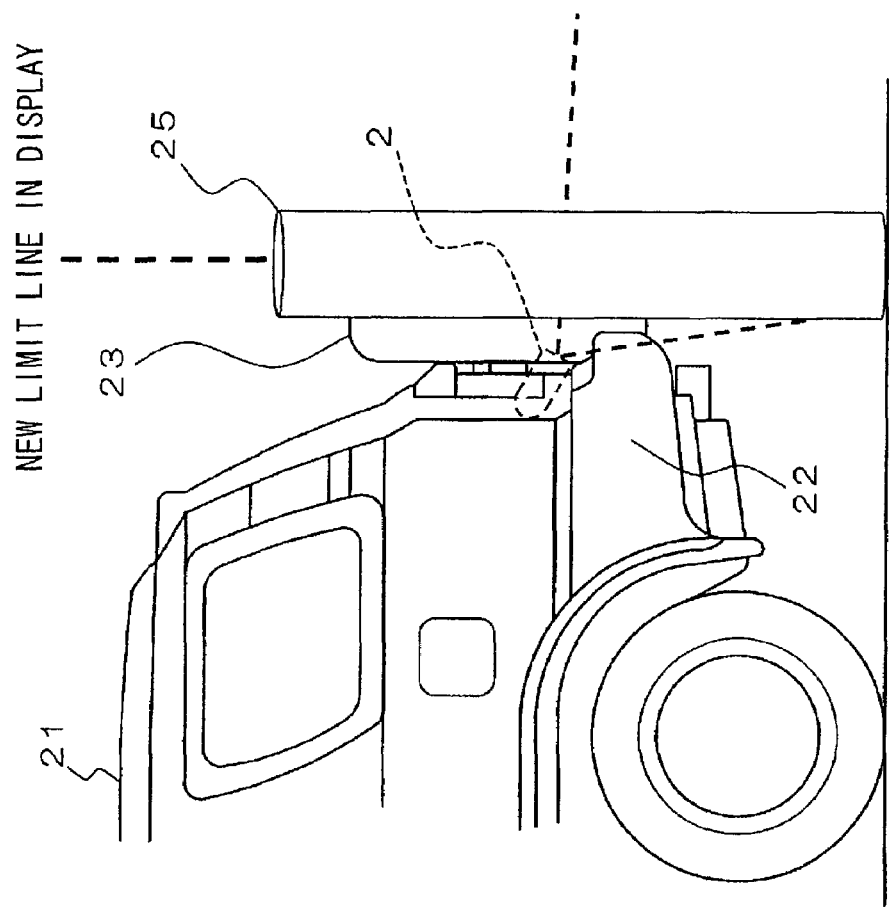
FIG. 7 is a view for showing a relative position of a vehicle and obstacles when a vehicle is parked using a rearview monitoring apparatus for a vehicle according to the second example of the embodiments.

Also, as shown in FIG. 6, if an obstacle around the vehicle is a pole obstacle 25, the positioning relationship of the pole obstacle 25 and the spare tire 23 is displayed accurately on the rearview image. Therefore, as shown in FIG. 7, the occupants in the vehicle can park the vehicle 21 very close to the pole obstacle 25 so that the spare tire 23 will not contact the pole obstacle 25 so as to avoid collision with the pole obstacle 25.

Also, in the above example, the vehicle's protruding region is explained with reference to the spare tire 23 which is attached to the rear end of the vehicle 21. It is acceptable that the vehicle's protruding region have other structures such as a ski carrier as long as its protruding dimensions are known in advance and the vehicle index can be produced according to the protruding dimension.

As explained above, the rearview monitoring apparatus 1 for a vehicle according to the present example can reliably avoid contact of the protruding region and the obstacle around the vehicle so as that the vehicle may be parked very close to obstacles around the vehicle by displaying the vehicle's protruding region such as a spare tire and a ski carrier which protrude from the rear end of the vehicle in a form of line and picture in the rearview image.

Also, as shown in the second example of the present invention, when the obstacle such as a pole obstacle around a vehicle is sufficiently narrower than the width dimension of the vehicle, it is possible to park the vehicle while avoiding the pole obstacle so that the vehicle's protruding region does not contact the pole obstacle by displaying the projected shadow image of the vehicle's protruding region in the rearview image.

Furthermore, other embodiments of the rearview monitoring apparatus 1 for a vehicle according to the present invention is explained with reference to drawings as follows.

Figure 19:
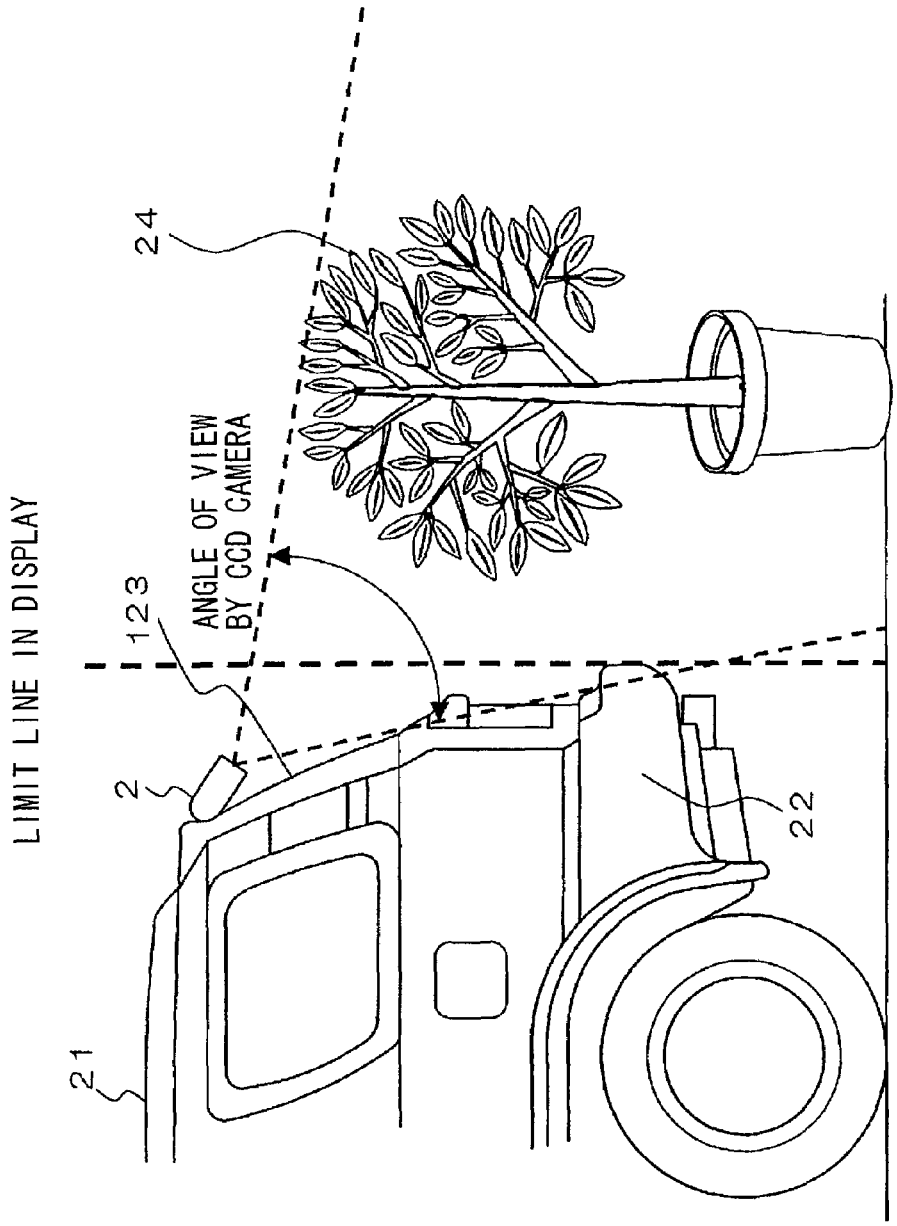
FIG. 19 is a view for showing a conventional positioning relationship of a vehicle and a camera.
Figure 20:
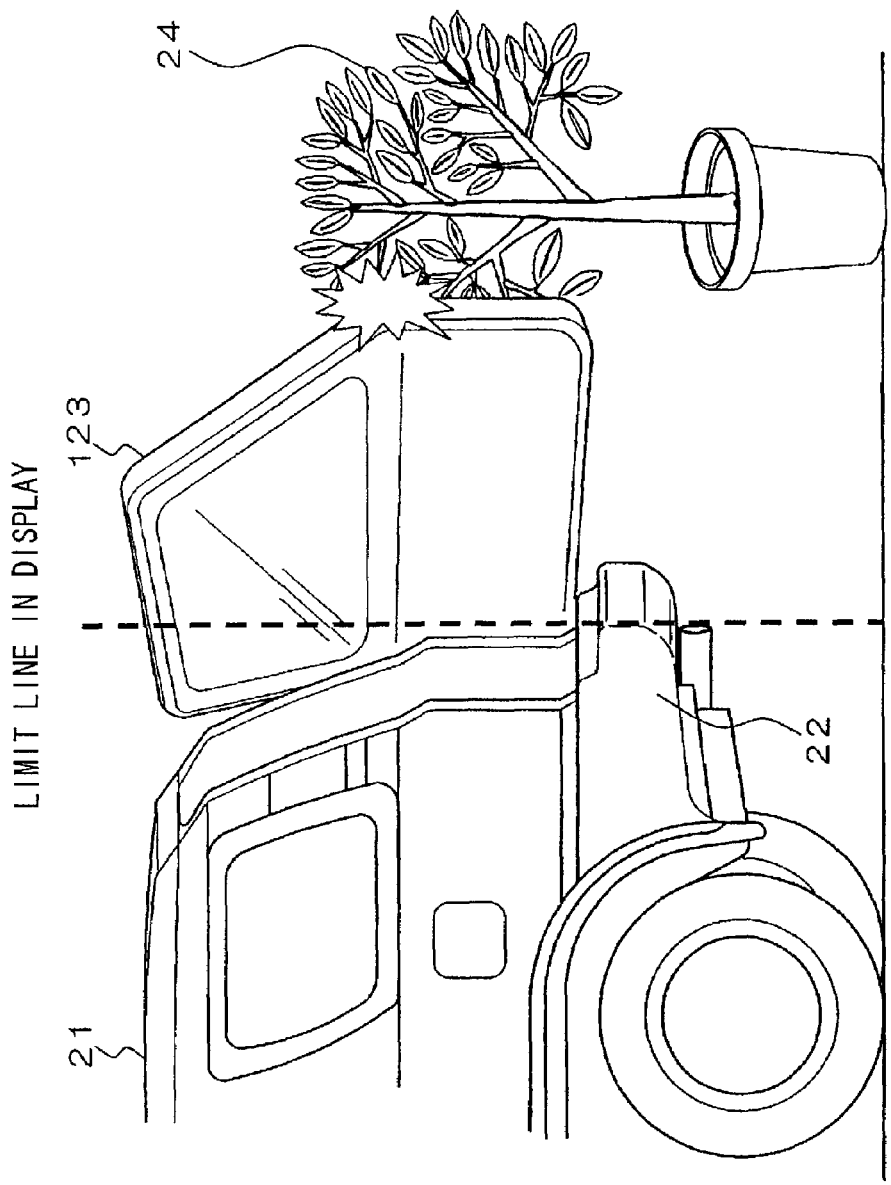
FIG. 20 is a view for showing a relative position of a vehicle and obstacles when a vehicle is parked using a conventional apparatus.

A rearview monitoring apparatus for vehicles according to the present invention may comprise a CCD camera 2 which is provided in the back of the vehicle 21 for covering rear view of the vehicle 21 as shown in FIGS. 19 and 20, a control section 3 which includes a CPU for controlling operations of each unit in the rearview monitoring apparatus for a vehicle by executing an application programs for controlling the displayed image, a monitoring device 4 for displaying the rearview image which is output from the control unit 3 for the occupants in the vehicle 21, and a speaker 5 for notifying the occupants in the vehicle of the approach to an obstacle around the vehicle by voice or sound messages.

In addition, as shown in FIG. 20, a tailgate 123 has a notch unit which can gradually maintain its opening amount to the vehicle 21.

Also, the control unit 3 is provided with a vehicle index database 6 for storing the vehicle index which indicates an opened tailgate 123 in advance of displaying the tailgate 123 (rear door of the vehicle 21) which is opened in a rear direction over the rear reference position of the vehicle 21 as shown in FIGS. 19 and 20 in the rearview image and a superposed image displaying device 7 for displaying the superposed image of the rearview image taken by the CCD camera 2 and the vehicle index which is stored in the vehicle index database 6 on the monitoring device 4.

The control unit 3 in the second example is the same as that in the first example; therefore, the explanation thereof is omitted.

Next, another example of the operation of the rearview monitoring apparatus for a vehicle according to the present embodiment is explained with reference to the drawings as follows.

THIRD EXAMPLE

A third example of the present invention is explained with reference to a case in which the rearview monitoring apparatus for a vehicle displays a superposed image of the rear door as a vehicle index indicated by a line which is opened in a rear direction over the rear reference position of the vehicle in a position corresponding to the opened rear door in the rearview image.

Figure 8:
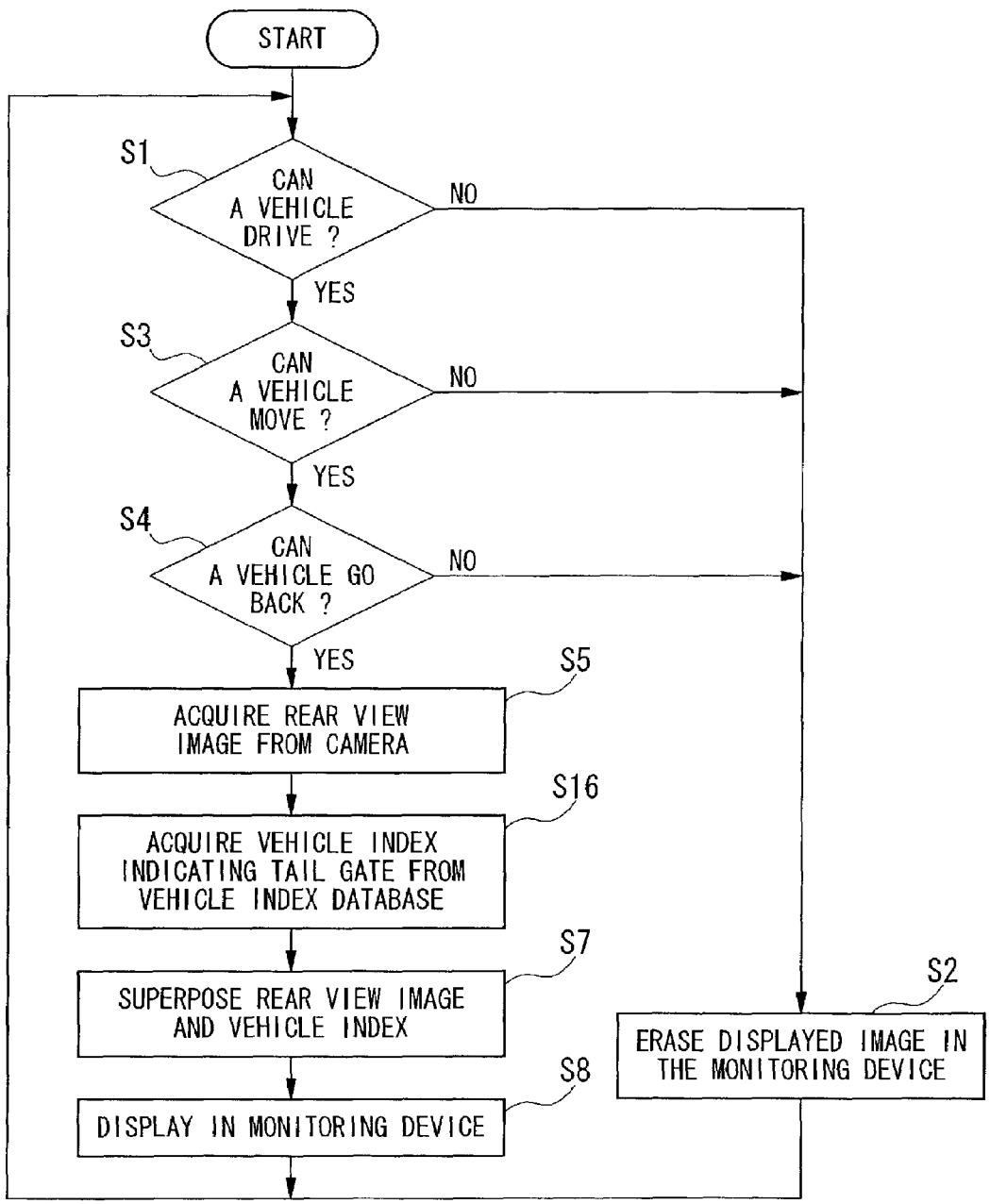
FIG. 8 is a flow chart showing a movement of the rearview monitoring apparatus for a vehicle according to an embodiment of the present invention.

Steps 1 through 5 in a flow chart shown in FIG. 8 show the operation of the rearview monitoring apparatus 1 for a vehicle for displaying the rearview image in the monitoring device 4 are the same as the first example; thus the explanation thereof is omitted.

The superposed image displaying device 7 acquires a vehicle index which indicates a tailgate 123 from the vehicle index database 6 (Step S16).

After that, the superposed image displaying device 7 superposes the vehicle index which indicates a tailgate 123 in the rearview image (Step S17), and displays the superposed image in the monitoring device 4 (Step S8).

After the rearview image to which the vehicle index is superposed is displayed in the monitoring device 4, the superposed image displaying device 7 in the control unit 3 returns to Step S1 and repeats the above-mentioned processes.

Here, when the monitoring device 4 displays the superposed image, it is acceptable for the control unit 3 to determine whether or not a light of the vehicle 21 is turned on by the light control signal (whether or not it is dark around the vehicle 21) and brightness and contrast of the rearview image which is displayed on the monitoring device 4 are adjusted automatically.

Figure 9:
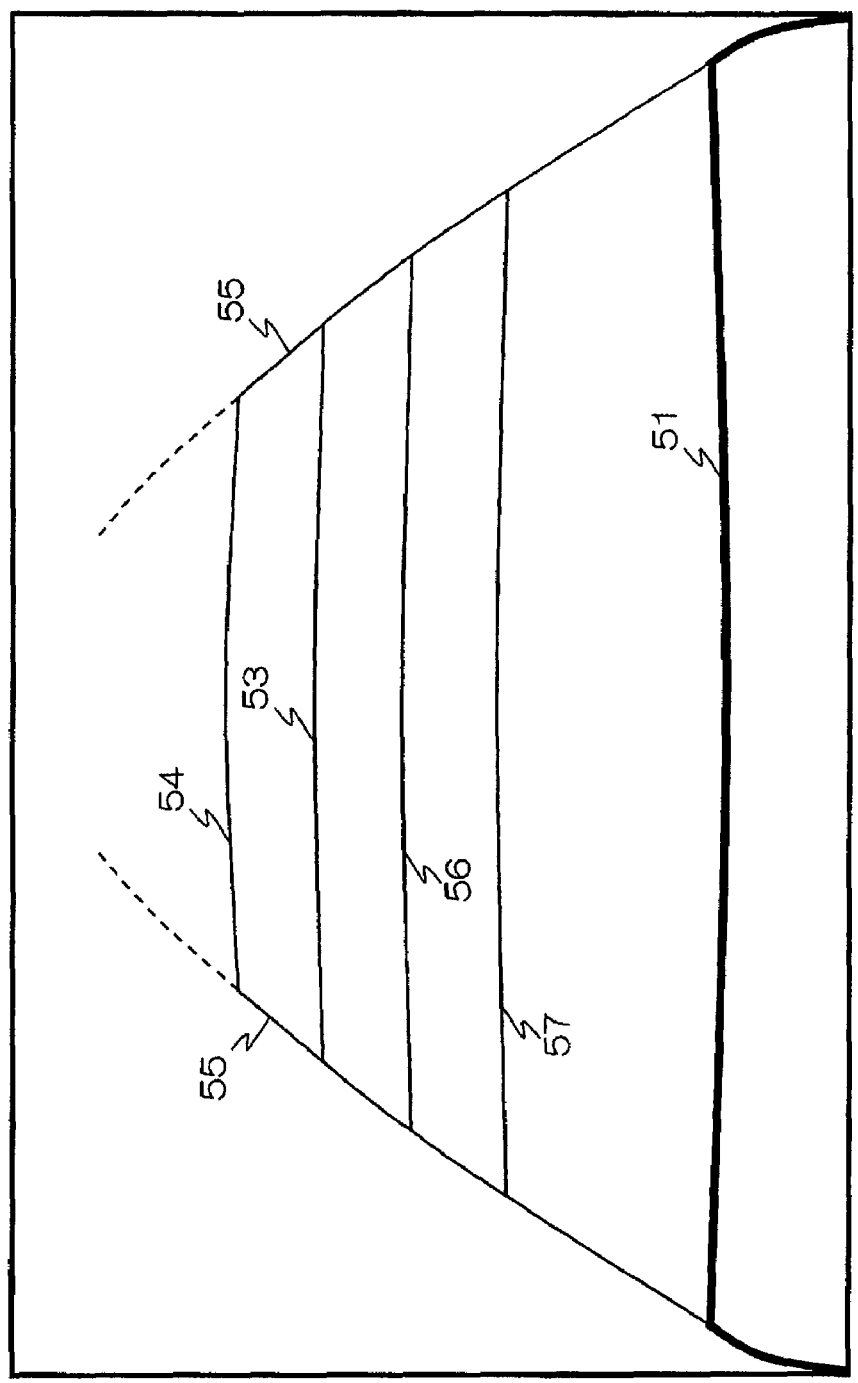
FIG. 9 is a view for showing an example of displayed rearview image in the third example of embodiments.

FIG. 9 is a view for showing an example of displayed rearview image according to the embodiment of the present invention. In FIG. 9, a distance index 52 which indicates 1 m of distance from a rear end of a conventional bumper, a distance index 53 which indicates 2 m of distance from a rear end of a conventional bumper, and a distance index 54 which indicates 3 m of distance from a rear end of a conventional bumper are displayed. In addition, in FIG. 9, a plurality of vehicle indexes such as tailgate line A56 and tailgate line B57 corresponding to the opening amount of the tailgate 123 which can be maintained open gradually are displayed as vehicle indexes for indicating a position of the rear end of the tailgate 123 which is not displayed in the rearview image as a real image.

Figure 10:
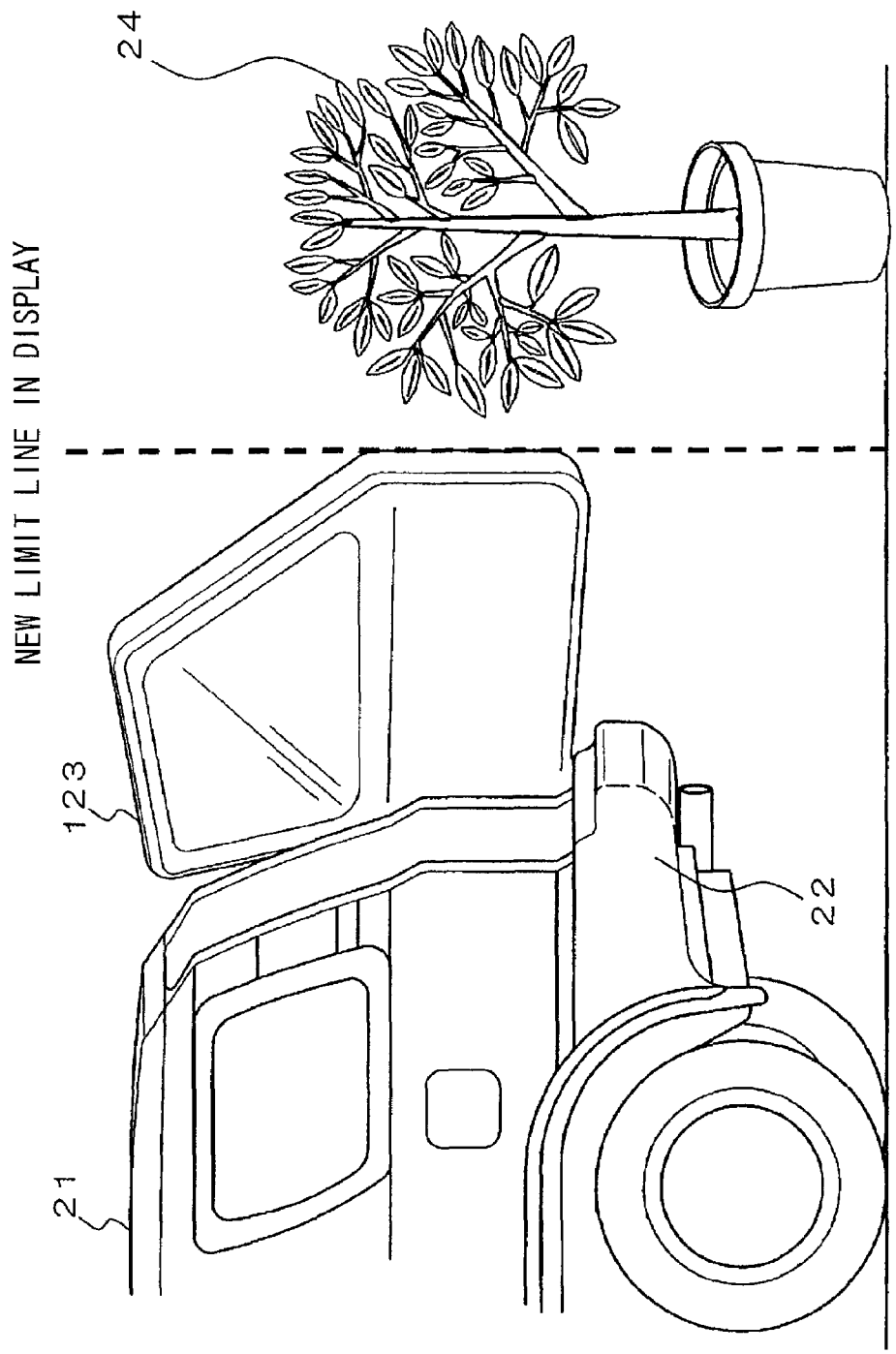
FIG. 10 is a view for showing a relative position of a vehicle and obstacles when a vehicle is parked using a rearview monitoring apparatus for a vehicle according to the third example of the embodiments.

Therefore, as shown in FIG. 10, the occupants in the vehicle can park the vehicle 21 very close to an obstacle 24 having the space necessary for a tailgate 23 to open in a rear direction of the vehicle 21.

FOURTH EXAMPLE

Next, a fourth example of the present invention is explained with reference to a case in which the rearview monitoring apparatus for a vehicle displays a superposed image of the rear door as a vehicle index indicated by a shadow picture of an opening track of a rear door which is projected on the road surface opening in a rear direction over the rear reference position of the vehicle in a position corresponding to the opened rear door in the rearview image.

Here, an operation by the rearview monitoring apparatus 1 for a vehicle for displaying the rearview image in the monitoring device 4 is the same as that of the third example.

Figure 11:
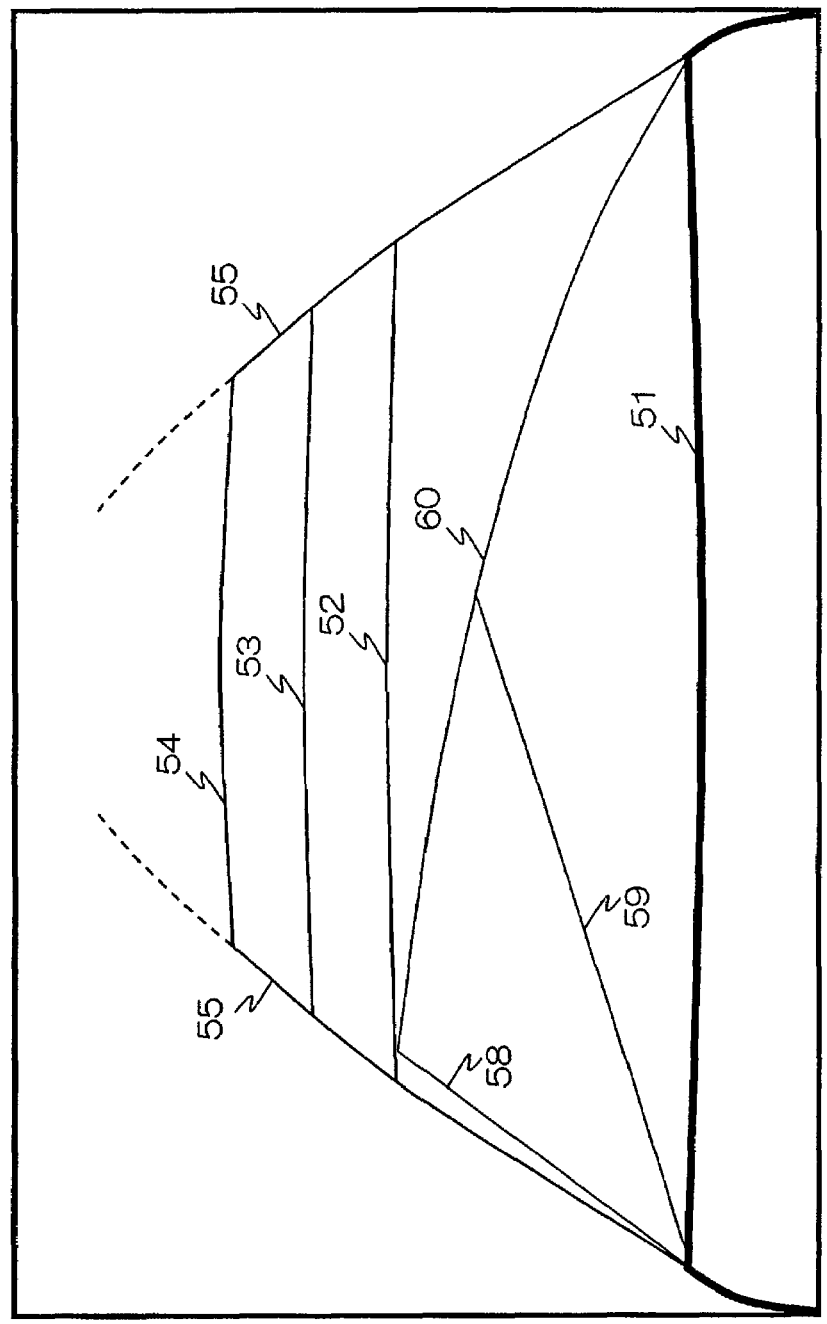
FIG. 11 is a view for showing an example of displayed rearview image according to a fourth example of the embodiments.

FIG. 11 is a view for showing an example of a displayed rearview image according to the fourth example of the present invention.

In FIG. 11, a distance index 52 which indicates 1 m of distance from a rear end of a conventional bumper, a distance index 53 which indicates 2 m of distance from a rear end of a conventional bumper, and a distance index 54 which indicates 3 m of distance from a rear end of a conventional bumper are displayed. In addition, in FIG. 11, a plurality of vehicle indexes such as tailgate line C58, tailgate line D59, and a tailgate opening track line 60 corresponding to opening amount of the tailgate 123 which can be maintained open gradually are displayed in a form of a shadow picture of the opening track of the tailgate 123 on the road surface for indicating a position of the rear end of the tailgate 123 which is not displayed in the rearview image as a real image.

Figure 12:
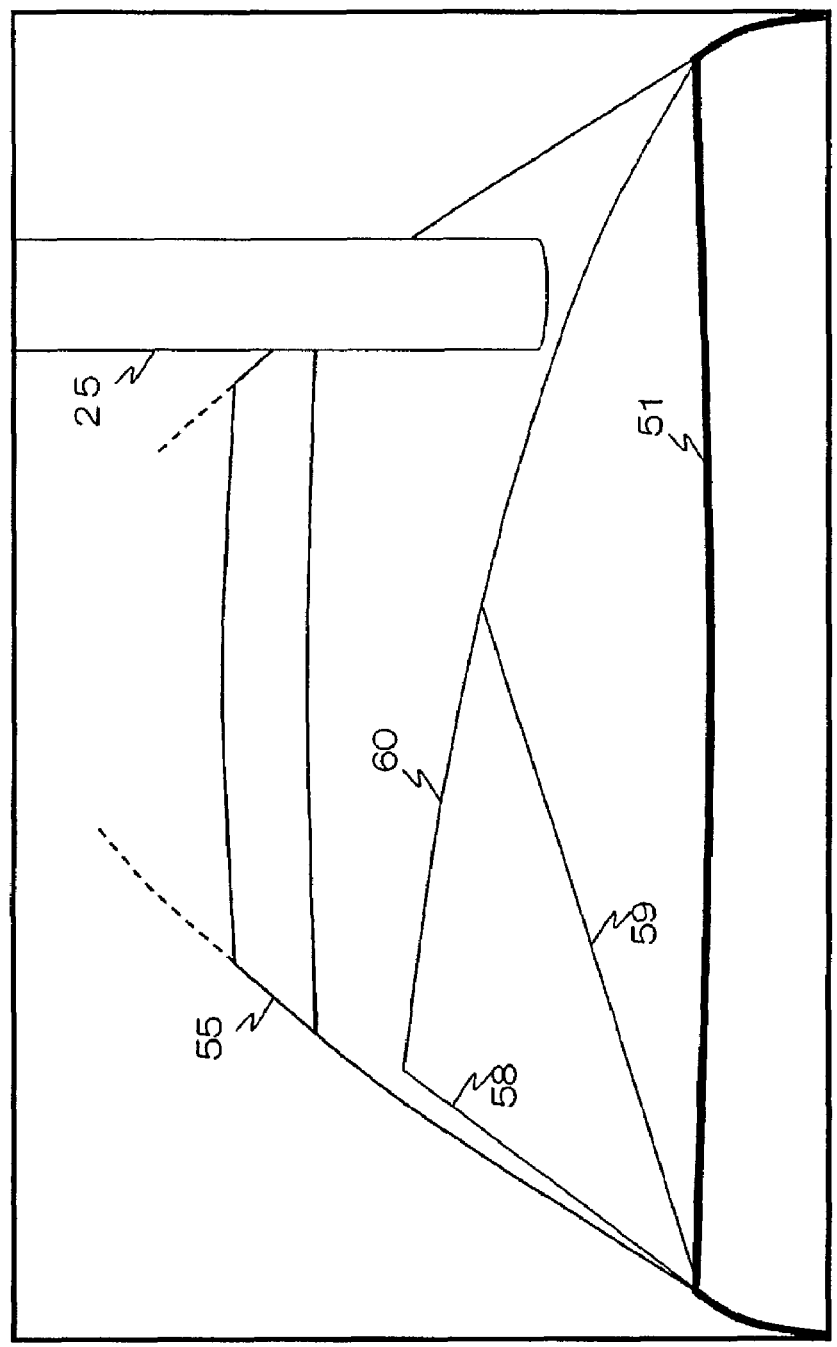
FIG. 12 is a view for showing an example of displayed obstacle in the rearview image according to the example.
Figure 13:
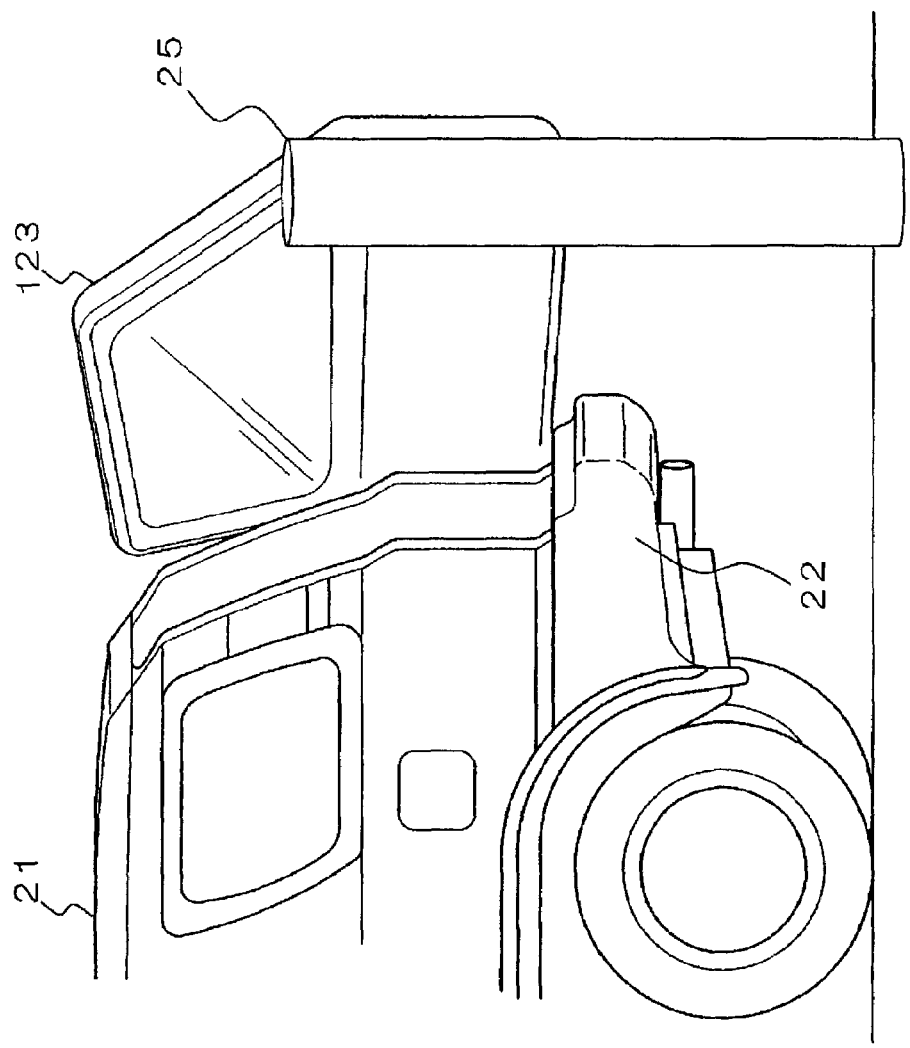
FIG. 13 is a view for showing a relative position of a vehicle and obstacles when a vehicle is parked using a rearview monitoring apparatus for a vehicle according to the fourth example of the embodiments.
Figure 14:
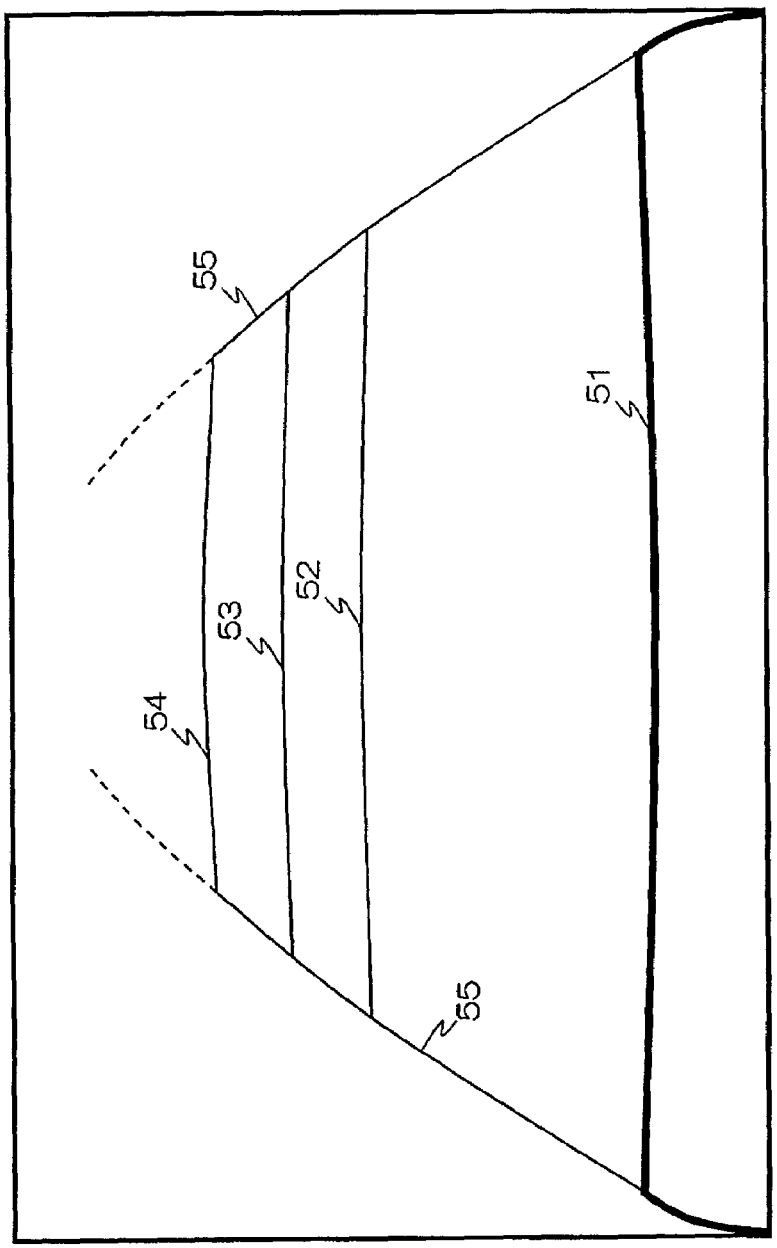
FIG. 14 is a view for showing an example of displayed rearview image according to a conventional apparatus.

Also, as shown in FIG. 12, when the obstacle around the vehicle is a pole obstacle 25, a positioning relationship of the pole obstacle 25 and the opening track of the tailgate 123 is displayed in the rearview image clearly. Therefore, as shown in FIG. 13, the occupants in the vehicle 21 can park the vehicle 21 very close to the pole obstacle 25 so that the opening tailgate 123 does not contact the pole obstacle 25.

As explained above, by the rearview monitoring apparatus 1 for a vehicle according to the present invention, it is possible to park the vehicle 21 very close to the obstacle around the vehicle by displaying the open rear door of the vehicle in the form of picture and line which cannot be acknowledged during parking the vehicle having a necessary distance between the tailgate and the obstacle around the vehicle while opening and closing the tailgate of the vehicle after the vehicle is parked.

Also, particularly in the case of the fourth example, when the obstacle such as a pole obstacle around the vehicle is narrower than the width of the vehicle, it is possible to park the vehicle while preventing the opening track of the tailgate from interfering with the pole obstacle.

What is claimed is:

1. A rearview monitoring apparatus for a vehicle for displaying an image of the vehicle's rearview captured by a camera so that occupants in the vehicle can monitor the rearview image, the apparatus comprising:

a vehicle index storing device for storing a vehicle index representing a vehicle's protruding region which protrudes over a rear reference position of the vehicle;

a superposed image displaying device for superposing the vehicle index onto the vehicle's protruding region in the rearview image according to the position of the vehicle's protruding region, wherein the camera is mounted next to the vehicle's protruding region at the same height as the vehicle's protruding region, and the rear reference position of the vehicle is a rear end surface of a bumper which is attached to the back of the vehicle.

2. A rearview monitoring apparatus for a vehicle according to claim 1, wherein the vehicle's protruding region is a spare tire which is attached to the back of the vehicle.

3. A rearview monitoring apparatus for a vehicle according to claim 1 wherein the vehicle index is a projected image of the vehicle's protruding region an a road surface.

4. A rearview monitoring apparatus for a vehicle according to claim 2 wherein the vehicle index is a projected image of the vehicle's protruding region on a road surface.

* * * * *